(12) United States Patent
Kobayashi et al.

(10) Patent No.: US 7,958,984 B2
(45) Date of Patent: Jun. 14, 2011

(54) FRICTION PLATE FOR WET-TYPE MULTIPLATE CLUTCH

(75) Inventors: Masahiro Kobayashi, Fukuroi (JP); Hiroyuki Kinpara, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 720 days.

(21) Appl. No.: 11/964,199

(22) Filed: Dec. 26, 2007

(65) Prior Publication Data

US 2008/0179162 A1 Jul. 31, 2008

(30) Foreign Application Priority Data

Jan. 30, 2007 (JP) ................................. 2007-018629

(51) Int. Cl.
*F16D 13/74* (2006.01)
*F16D 13/64* (2006.01)
(52) U.S. Cl. ............. 192/113.36; 192/70.12; 192/107 R
(58) Field of Classification Search ............... 192/113.36
See application file for complete search history.

(56) References Cited

U.S. PATENT DOCUMENTS

| 6,062,367 | A | 5/2000 | Hirayanagi et al. | |
| 6,499,579 | B2 * | 12/2002 | Ono et al. ................ | 192/113.36 |
| 6,557,685 | B2 * | 5/2003 | Hattori ....................... | 192/70.12 |
| 7,172,062 | B2 | 2/2007 | Kitahara et al. | |
| 7,789,209 | B2 * | 9/2010 | Miyazaki et al. .......... | 192/70.12 |
| 2005/0217965 | A1 * | 10/2005 | Muranaka et al. ........ | 192/113.36 |
| 2007/0017773 | A1 | 1/2007 | Suzuki et al. | |
| 2007/0199794 | A1 | 8/2007 | Miyazaki et al. | |

FOREIGN PATENT DOCUMENTS

| JP | 11-141570 | 5/1999 |
| JP | 2005-076759 | 3/2005 |

* cited by examiner

*Primary Examiner* — Rodney H Bonck
(74) *Attorney, Agent, or Firm* — Kenealy Vaidya LLP

(57) ABSTRACT

A friction plate for a wet-type multiplate clutch can include a core plate and friction linings bonded on opposite sides of the core plate, respectively. Each of the friction linings can include plural segment pieces bonded at angular intervals on a corresponding opposite side. The segment pieces can each include at least one first oil groove and at least one second oil groove. The first oil groove opens to a radially-inner side of its corresponding segment piece and has a closed end portion located in a radially-intermediate part of the corresponding segment piece. The second oil groove opens to a radially-outer side of the corresponding segment piece and has a closed end portion located in another radially-intermediate part of the corresponding segment piece. Adjacent ones of the segment pieces are provided, in radially-middle parts of opposing side walls thereof, with angularly-extending recessed portions, respectively.

4 Claims, 5 Drawing Sheets

FRICTION PLATE FOR WET-TYPE MULTIPLATE CLUTCH

CROSS-REFERENCE TO RELATED APPLICATION

This application claims the priority of Japanese Patent Application 2007-018629 filed Jan. 30, 2007, which is incorporated herein by reference.

FIELD OF THE INVENTION

This invention relates to a friction plate for a wet-type multiplate clutch useful as a clutch, a brake or the like in an automatic transmission.

BACKGROUND OF THE INVENTION

FIG. 1 is a cross-sectional view illustrating the fundamental construction of a wet-type multiplate clutch 10. FIG. 1 shows a clutch casing 21, a counterpart hub 22 to which rotations are to be transmitted, a spline groove 23 formed on the clutch casing 21, a spline groove 24 formed on the hub 22, a piston 25 for pressing separator plates 30 and friction plates 40 against a backing plate 26, a snap ring 27 supporting the backing plate 26, and a sealing ring 28 for the piston 25. The separator plates 30 are maintained in fitting engagement with the spline groove 23, while the friction plates 40 are maintained in fitting engagement with the spline groove 24.

Recently, there is an ever-increasing demand for improvements in the fuel economy of automobiles. Keeping in step with this trend, there is an outstanding demand for a further reduction in the idling drag between friction plates and separator plates during non-engagement of a clutch in an automatic transmission.

There have hence been employed friction plates provided with friction linings, each of which has one or more oil grooves having closed end portions to separate the friction plates from their associated separator plates during non-engagement of a clutch and also has one or more oil passages extending radially through the friction lining to feed lube oil onto a friction surface for the prevention of seizure during engagement of the clutch. (See, for example, JP-A-11-141570 and JP-A-2005-76759)

Reflecting the demand for improvements in the shift response in an attempt to make not only an improvement in fuel economy and but also improvements in engine performance, the clearances between friction plates and their associated separator plates have become smaller in recent years than before, tending to result in a greater drag torque due to intervening oil films during idling.

With such conventional friction plates, no sufficient drainage of lube oil is feasible on their friction surfaces, thereby failing to satisfactorily meet the demand for a further reduction in drag torque. Especially during rotation in a low-speed range, the drainage of intervening lube oil between the friction plates and the associated separator plates is not sufficient so that the drag torque cannot be reduced.

When the friction surface of each friction lining is provided with plural oil grooves opening to a radially-outer side of the friction lining, lube oil which has been drawn onto the friction surface from an oilway is smoothly drained to the radially-outer side so that during idling, a drag torque can be reduced. This drag-torque reducing effect is high especially during low-speed rotation. Because the drawn lube oil is smoothly drained, frictional heat which is produced during clutch engagement is also removed smoothly together with the lube oil, so that the heat resistance of the friction lining is improved.

When the friction surface of each friction lining is provided with plural oil grooves opening to a radially-inner side of the friction lining and having closed radial outer end portions, these oil grooves are effective in keeping uniform the clearances between the friction plates and their associated separator plates during idling owing to the action that separate the friction plates and the separator plates from each other and, when the clutch is disengaged, can smoothly separate the friction plates and the separator plates from each other. These oil grooves are, therefore, effective in reducing an idling torque.

When a friction lining is formed into segment pieces and these segment pieces are bonded at angular intervals on one side of a core plate instead of bonding a friction lining as a single-piece element over the entire surface area of one side of the core plate, oil passages are formed between the respective segment pieces such that the oil passages extend through the friction lining from the radially-inner side to the radially-outer side. Accordingly, any extra lube oil is promptly drained, thereby effectively reducing an idling drag.

In an initial stage of clutch engagement, however, the lube oil which exists on each friction surface is quickly drained from the friction surface via these oil grooves and oil passages, and therefore, the cushioning effect of the lube oil is reduced to cause abrupt grabbing of the clutch in the initial stage of clutch engagement. The use of this clutch as a clutch, a brake or the like in an automatic transmission causes a problem that a shock is produced when the automatic transmission is shifted. It is, therefore, necessary to avoid such a shock.

SUMMARY OF THE INVENTION

To solve the above-described problem, the present invention provides a friction plate for a wet-type multiplate clutch, said friction plate being provided with a core plate and friction linings bonded on opposite sides of the core plate, respectively, each of said friction linings being composed of plural segment pieces bonded at angular intervals on the corresponding one of said opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein: each two adjacent ones of the segment pieces are provided, in radially-middle parts of opposing side walls thereof, with angularly-extending recessed portions, respectively.

Owing to the above-described construction, the friction plate according to the present invention has made it possible to avoid grabbing in an initial stage of clutch engagement because, when lube oil is drained from the recessed portions of each two adjacent segment pieces into the oil passage between the adjacent segment pieces upon clutch engagement, flows of the lube oil drained from the respective segment pieces run into each other to produce cushioning effect.

Even under such a lubrication environment that the clearances between friction plates and separator plates in a wet-type multiplate clutch are set narrow and lots of lube oil are fed, the present invention can avoid grabbing in an initial stage of clutch engagement while keeping a drag torque small during idling.

DETAILED DESCRIPTION OF THE INVENTION AND PREFERRED EMBODIMENTS

When the second oil grooves opening to the radially-outer side of the friction lining are formed with their angular widths increasing toward the radially-outer sides of the corresponding segment pieces, the drainage of lube oil increases. When the first oil grooves opening to the radially-inner side of the friction lining are formed with their angular widths decreasing from their open end portions toward their closed end portions, on the other hand, the effect of separating the friction plates and the separator plates from each other increases.

The shapes of the first and second oil grooves can be appropriately determined depending upon the friction surface area, friction characteristics, lube-oil feed rate, and so on.

Certain preferred embodiments of the present invention will hereinafter be described with reference to the accompanying drawings. FIG. 2 through FIG. 7 are front views of these embodiments, and show friction plates 41 to 45, a core plate 40A, segment pieces 51 to 55 of friction linings, spline teeth 40B to be maintained in fitting engagement with the spline groove 24 formed on the hub 22, and opposing side walls 81A, 81B to 85A, 85B of adjacent segment pieces 51 to 55, respectively.

Figure 1:
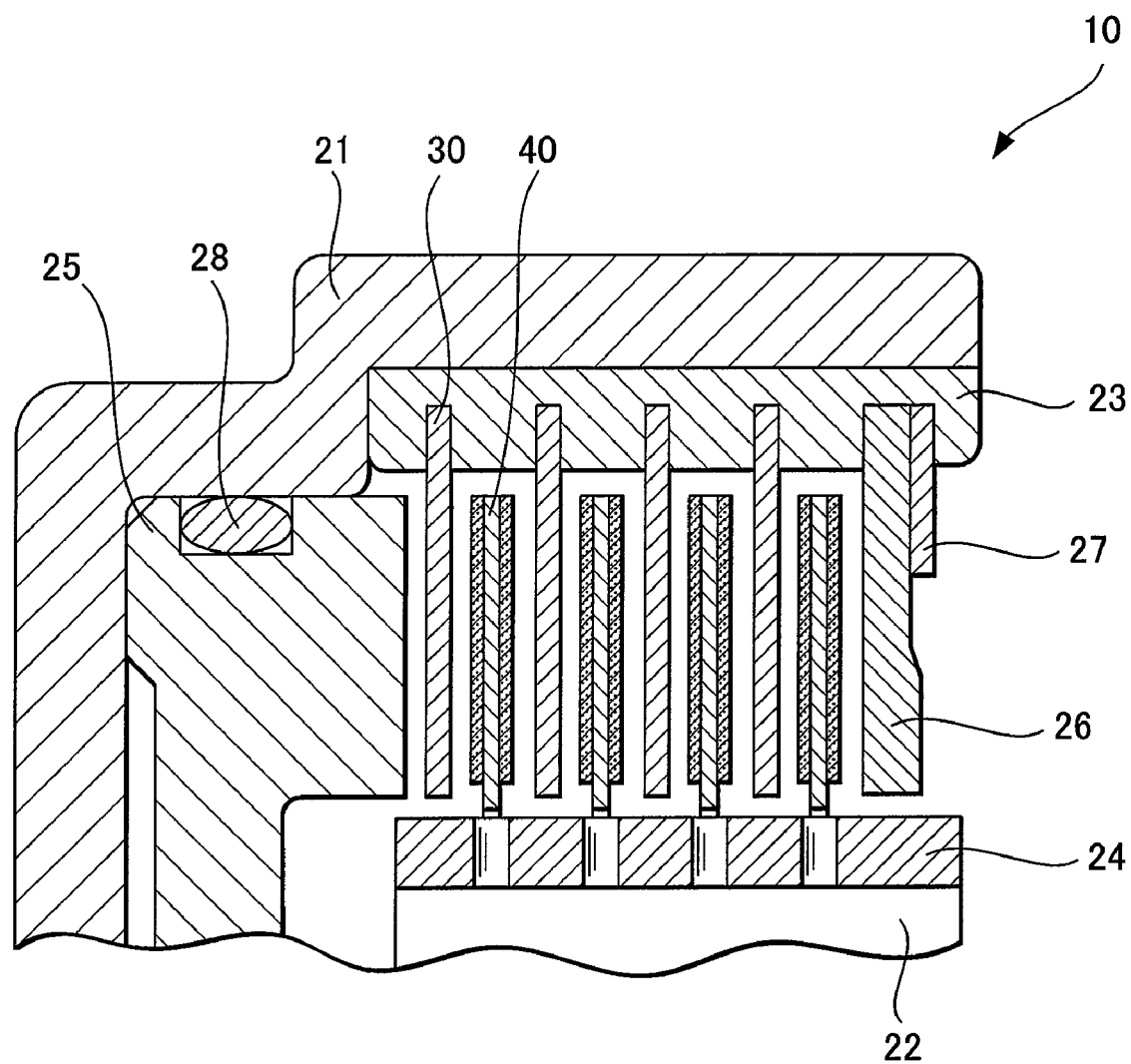
FIG. 1 is a cross-sectional view illustrating the fundamental construction of a wet-type multiplate clutch.
Figure 2:
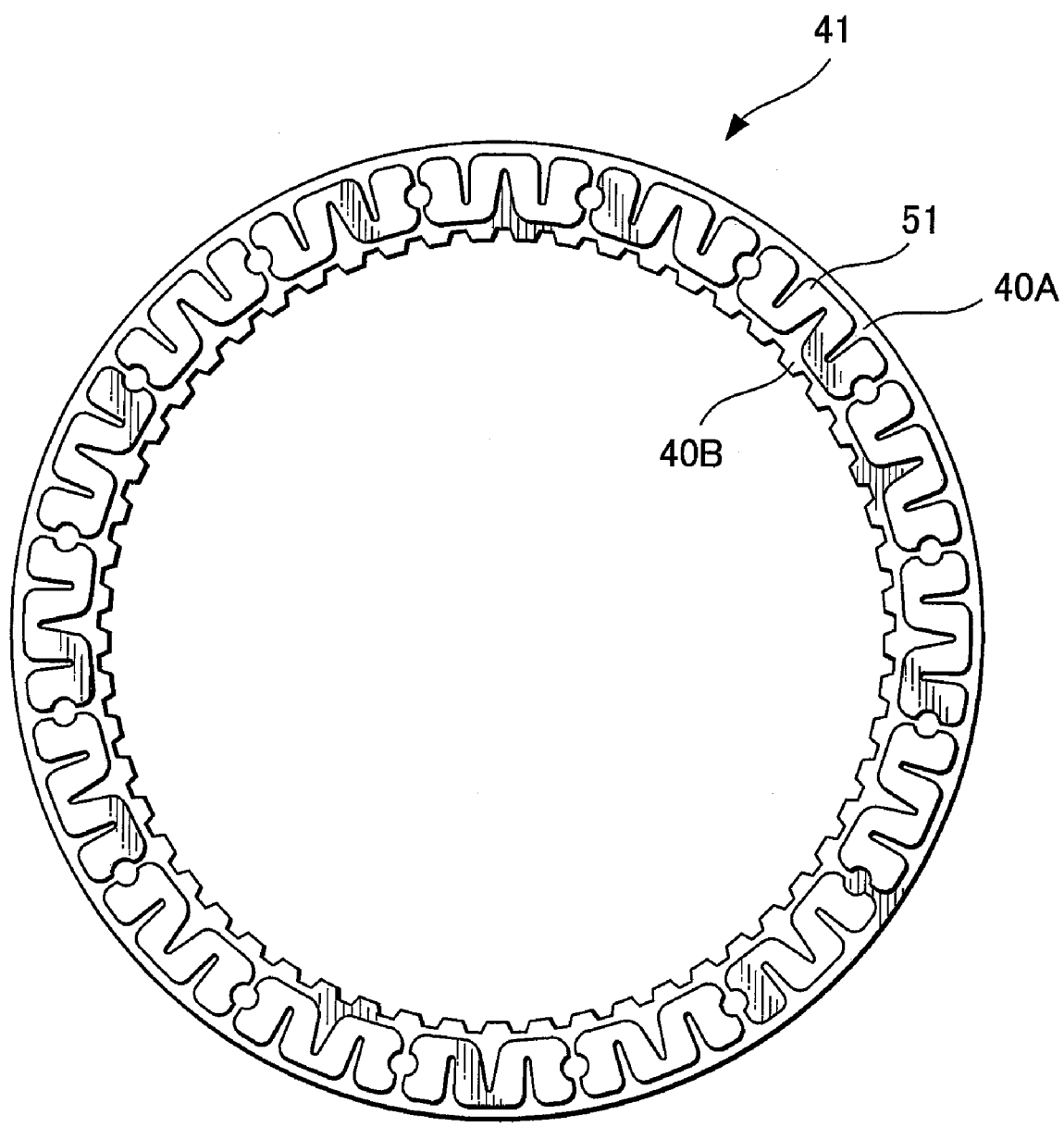
FIG. 2 is a fragmentary front view of a friction plate according to a first embodiment of the present invention.
Figure 3:
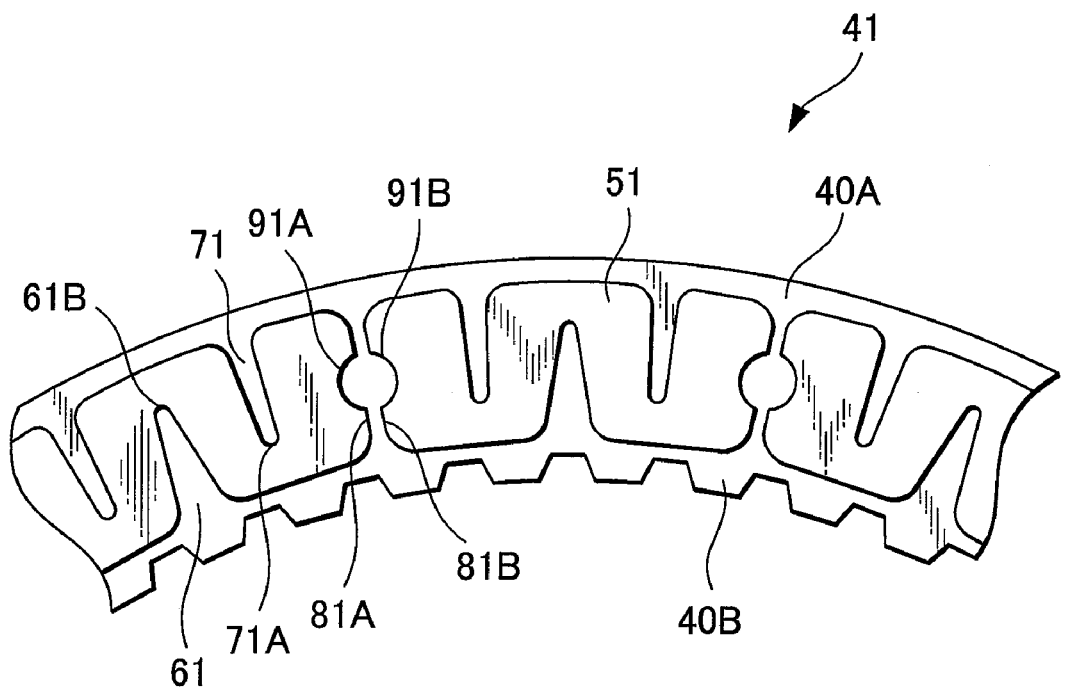
FIG. 3 is an enlarged fragmentary front view of the friction plate of FIG. 2.

FIG. 2 is a front view of the friction plate 41 according to the first embodiment, and FIG. 3 is an enlarged fragmentary front view of the friction plate 41 of FIG. 2. In this embodiment, recessed portions arranged in the opposing side walls 81A, 81B of each two adjacent segment pieces 51, 51 are formed as semi-circular recessed portions 91A, 91B. In each segment piece 51, a first oil groove 61 opening to a radially-inner side of the segment piece 51 (hereinafter called "the first oil groove") and second oil grooves 71 opening to a radially-outer side of the segment piece 51 (hereinafter called "the second oil grooves") are formed in V-shapes so that their angular widths become wider from their closed end portions 61B, 71A toward their open end portions, respectively. Further, the closed end portions 61B, 71A are located beyond a radial center line of the segment piece 51, respectively.

Figure 4:
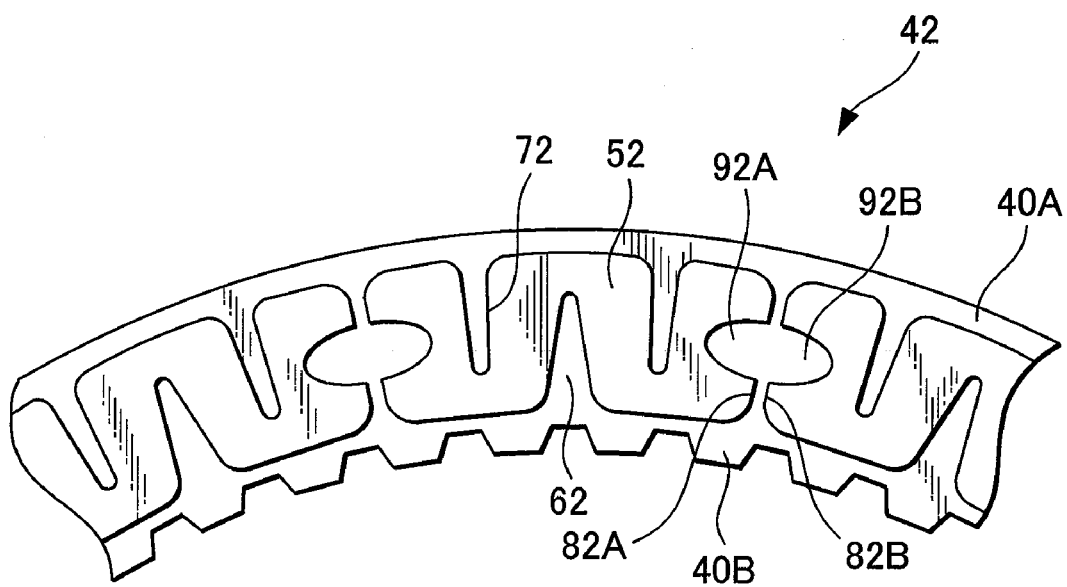
FIG. 4 is similar to FIG. 3, but illustrates a friction plate according to a second embodiment of the present invention.
Figure 5:
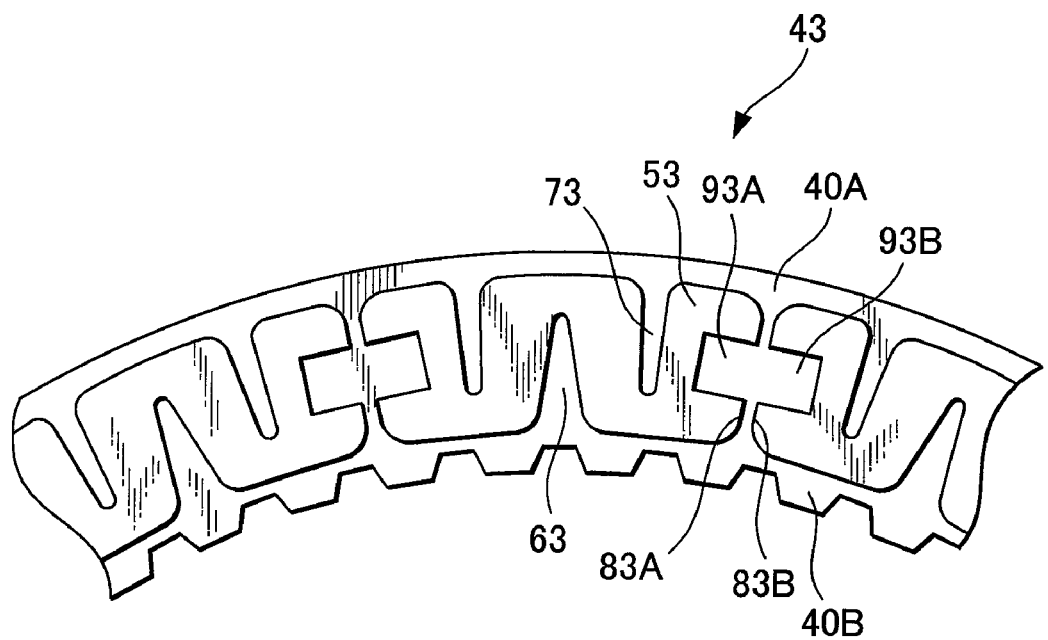
FIG. 5 is similar to FIG. 3, but illustrates a friction plate according to a third embodiment of the present invention.

FIG. 4 depicts the friction plate 42 according to the second embodiment. Recessed portions arranged in the opposing side walls 82A, 82B of each two adjacent segment pieces 52, 52 are formed as elongated semi-circular recessed portions 92A, 92B. In each segment piece 52, a first oil groove 61 and second oil grooves 72 are similar to the corresponding oil grooves in the first embodiment. FIG. 5 shows the friction plate 43 according to the third embodiment. Recessed portions arranged in the opposing side walls 83A, 83B of each two adjacent segment pieces 53, 53 are formed as rectangular recessed portions 93A, 94B.

Figure 6:
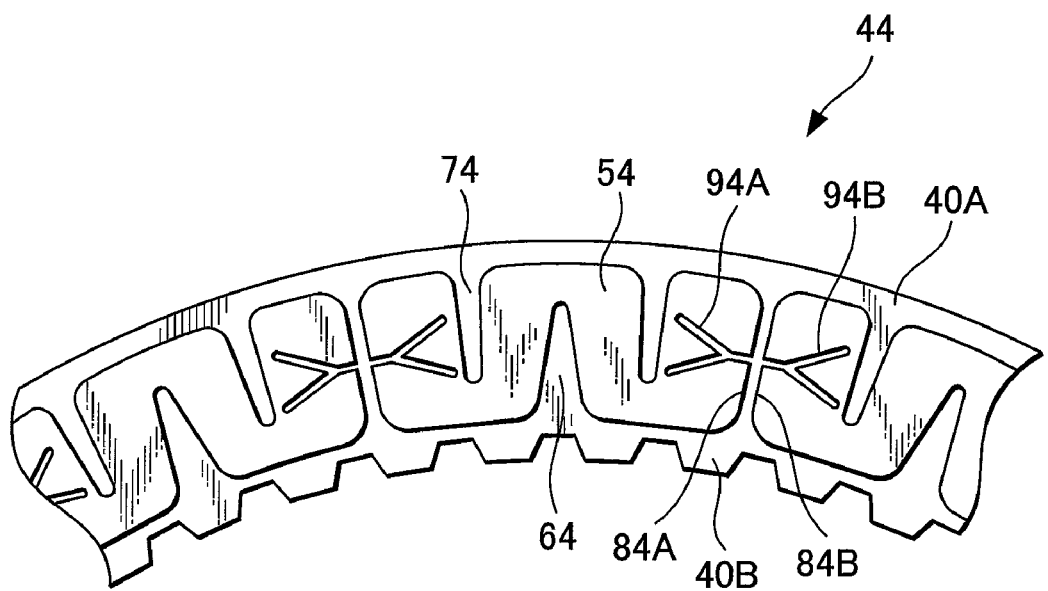
FIG. 6 is similar to FIG. 3, but illustrates a friction plate according to a fourth embodiment of the present invention.

FIG. 6 illustrates the friction plate 44 according to the fourth embodiment. Recessed portions arranged in the opposing side walls 84A, 84B of each two adjacent segment pieces 54, 54 are formed as Y-shaped recessed portions 94A, 94B. This fourth embodiment indicates that the recessed portions arranged in the opposing side walls of each two adjacent segment pieces can take desired shapes insofar as they permit the drainage of lube oil without any problem.

Figure 7:
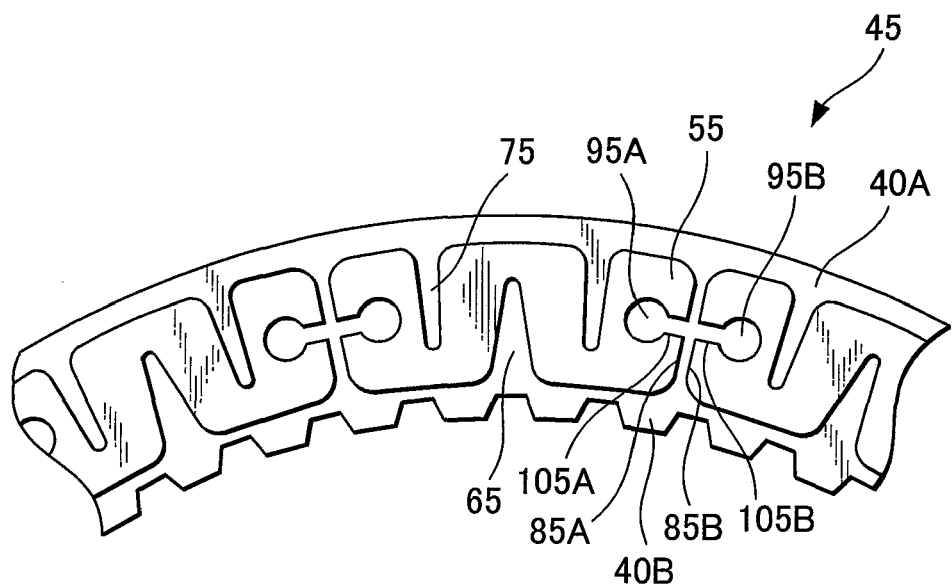
FIG. 7 is similar to FIG. 3, but illustrates a friction plate according to a fifth embodiment of the present invention.

FIG. 7 depicts the friction plate 45 according to the fifth embodiment. Recessed portions 95A, 95B arranged in the opposing side walls 85A, 85B of each two adjacent segment pieces 55, 55 are constricted at openings 105A, 105B thereof in the side walls 85A, 85B.

It is to be noted that in FIG. 4 through FIG. 7, the shapes of the first grooves 62 to 65 and second grooves 72 to 75 and the positions of their closed end portions (not identified by reference numerals) are exactly the same as the shapes of the corresponding grooves 61, 71 and the positions of their closed end portions 61B, 71A in FIG. 3.

Figure 8:
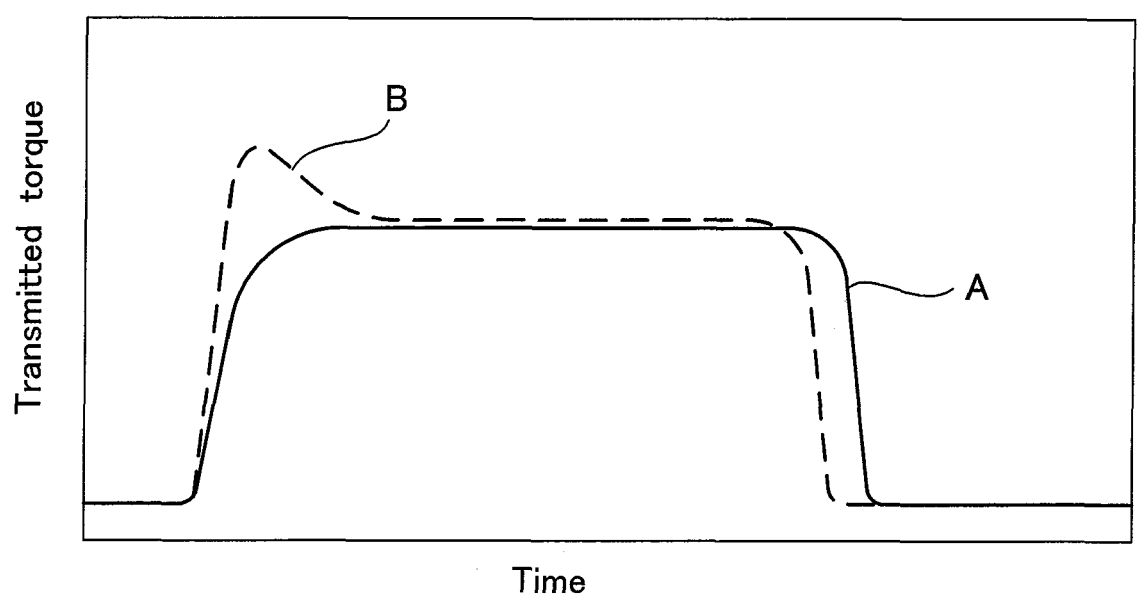
FIG. 8 is a graph illustrating advantageous effects of the present invention.

FIG. 8 diagrammatically illustrates advantageous effects of the present invention, in which transmitted torque is plotted along the ordinate while time is plotted along the abscissa. A broken line B shows time-torque characteristics of a conventional clutch, while a solid line A corresponds to the present invention. The conventional clutch developed grabbing in an initial stage of clutch engagement. With the present invention, it is indicated that a uniform transmission torque is available throughout clutch engagement.

The invention claimed is:

1. A friction plate for a wet-type multiplate clutch, said friction plate being provided with a core plate and friction linings bonded on opposite sides of said core plate, respectively, each of said friction linings being composed of plural segment pieces bonded at angular intervals on the corresponding one of said opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein:

each two adjacent ones of said segment pieces are provided, in radially-middle parts of opposing side walls thereof, with angularly-extending recessed portions, respectively; and said recessed portions are constricted at openings thereof in said side walls.

2. A friction plate according to claim 1, wherein said at least one first oil groove becomes narrower from an open end portion thereof toward said closed end portion thereof.

3. A friction plate according to claim 1, wherein said at least one second oil groove becomes wider from said closed end portion thereof toward an open end portion thereof.

4. A friction plate according to claim 1, wherein said closed ends of said at least one first oil groove and at least one second oil groove are located beyond a radial center line of the corresponding segment piece, respectively.

* * * * *